No. 778,727. PATENTED DEC. 27, 1904.
H. F. WEINLAND.
TUBE EXPANDER AND CUTTER.
APPLICATION FILED AUG. 19, 1903.
3 SHEETS—SHEET 3.
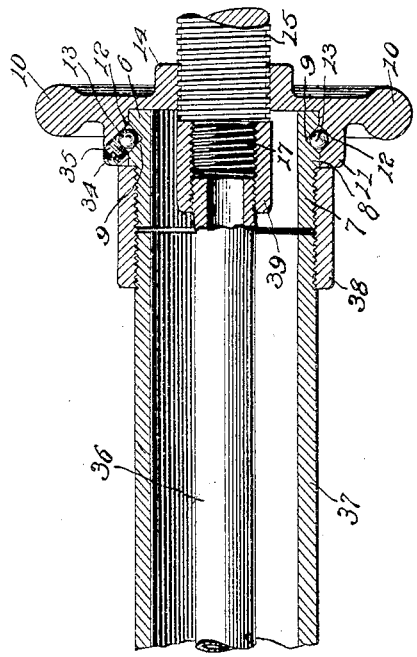
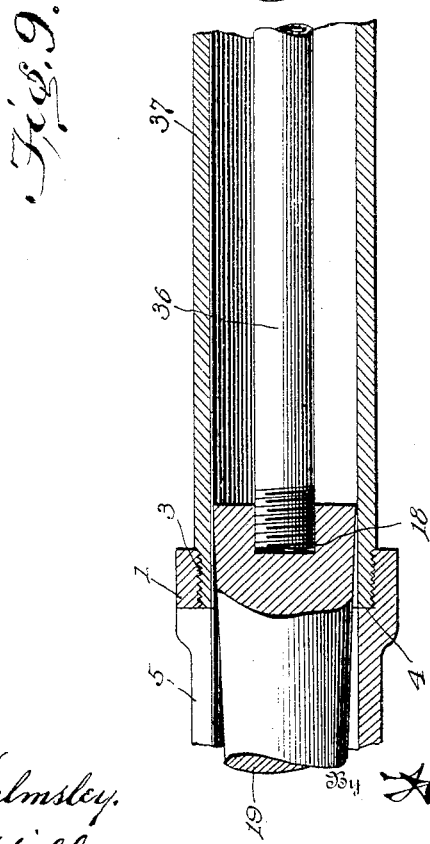
Fig. 9.
Witnesses
G. Howard Walmsley.
Irvine Miller.
Inventor
Henry F. Weinland,
By H. A. Toulmin,
Attorney No. 778,727. Patented December 27, 1904.

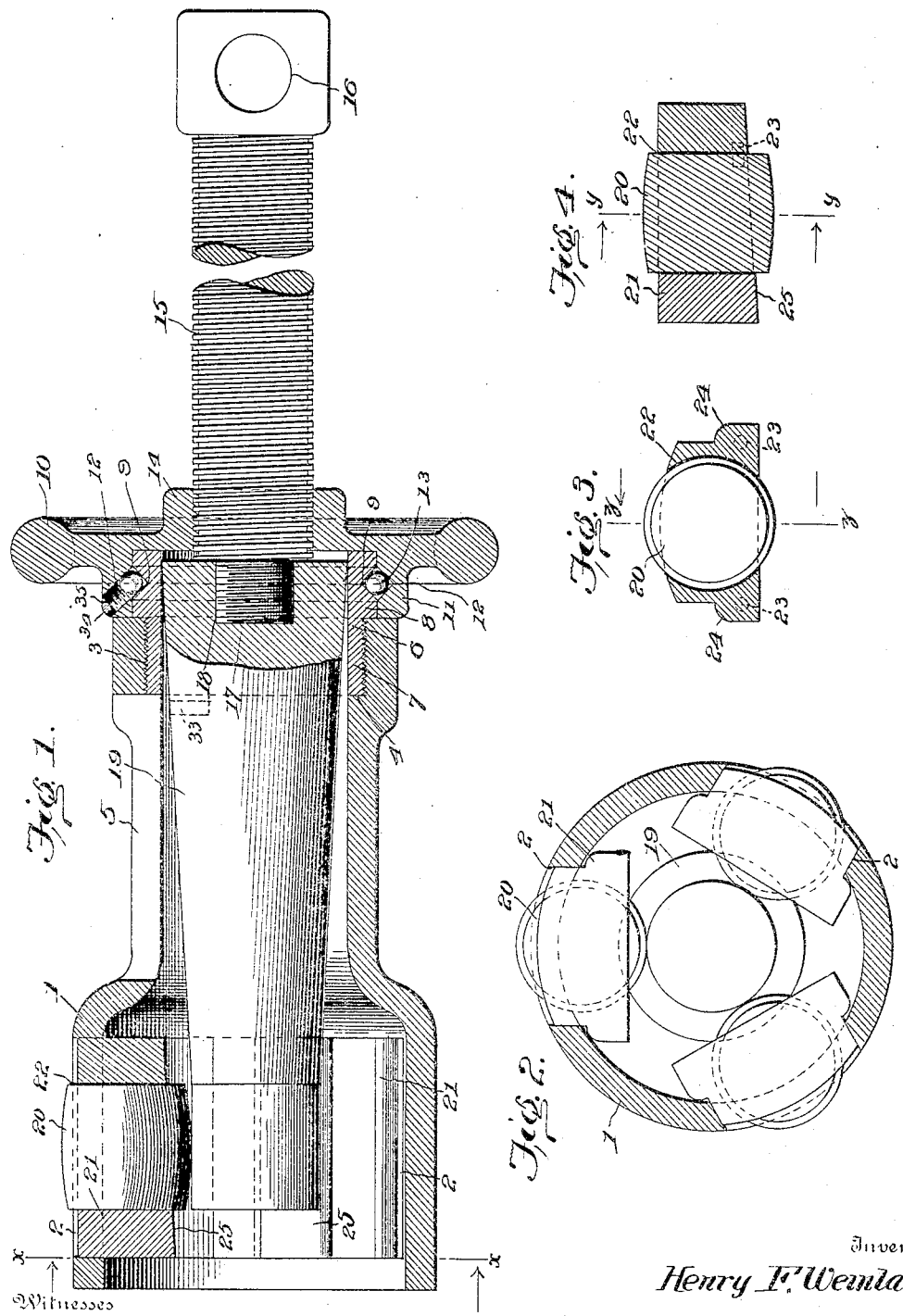

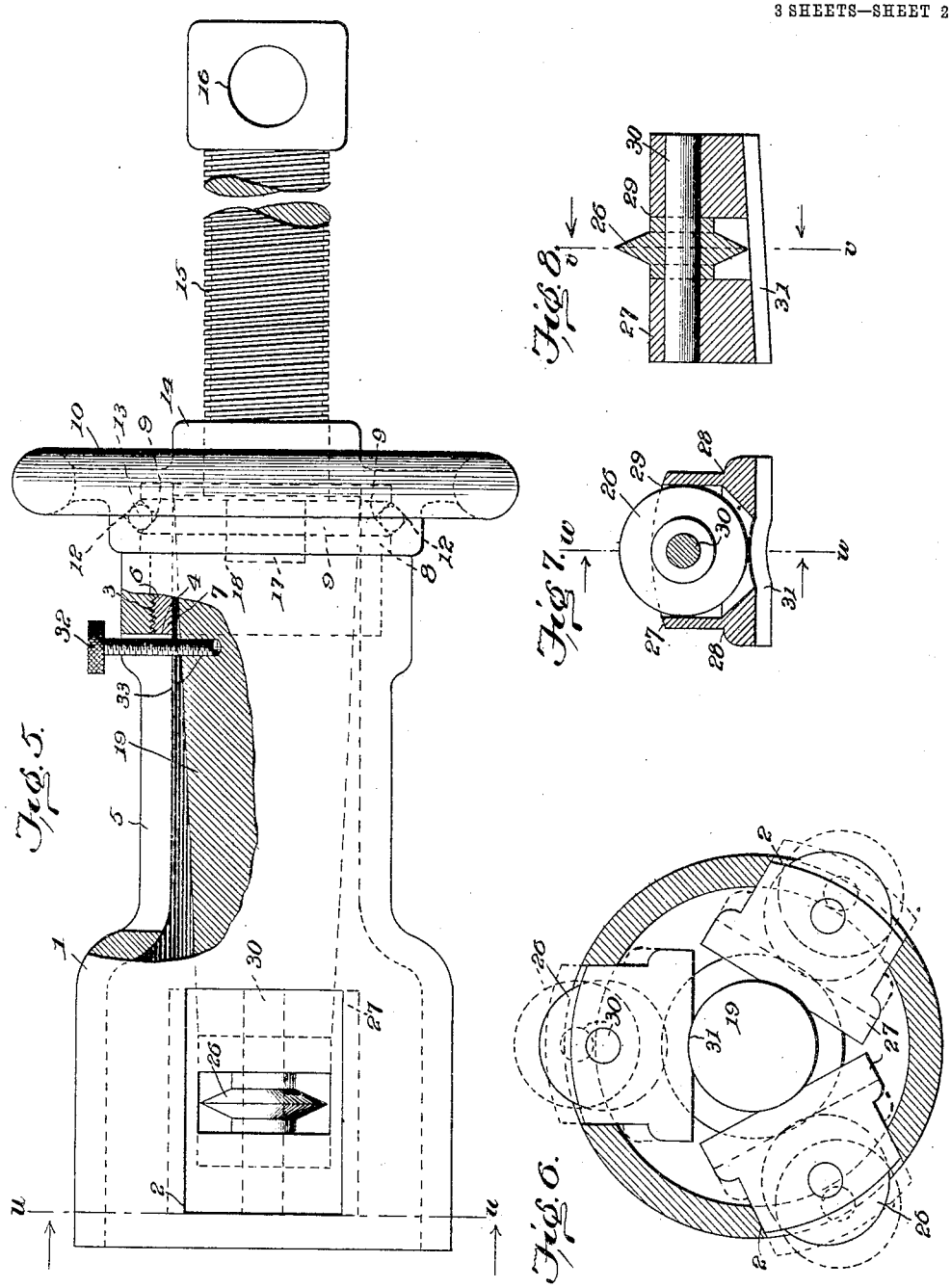

UNITED STATES PATENT OFFICE.

HENRY F. WEINLAND, OF SPRINGFIELD, OHIO, ASSIGNOR TO THE LAGONDA MANUFACTURING COMPANY, OF SPRINGFIELD, OHIO, A CORPORATION OF OHIO.

TUBE EXPANDER AND CUTTER.

SPECIFICATION forming part of Letters Patent No. 778,727, dated December 27, 1904.

Application filed August 19, 1903. Serial No. 169,994.

*To all whom it may concern:*

Be it known that I, HENRY F. WEINLAND, a citizen of the United States, residing at Springfield, in the county of Clark and State of Ohio, have invented certain new and useful Improvements in Tube Expanders and Cutters, of which the following is a specification, reference being had therein to the accompanying drawings.

This invention relates to improvements in combined tube expanders and cutters, and has for its object to provide a tool of this character which is readily convertible from an expander to a cutter or the reverse, which is simple and strong in construction, may be used as a tube-expander without requiring excessive power to operate it, and which may be adjusted to operate upon any portion of a tube of any length.

To these and other ends my invention consists in certain novel features, which I will now proceed to describe and will then particularly point out in the claims.

In the accompanying drawings, Figure 1 is a central longitudinal sectional view, partly in elevation, of a structure embodying my invention in one form, the same being arranged for use as an expander. Fig. 2 is a sectional view of the same, taken on the line $x\ x$ of Fig. 1 and looking in the direction of the arrows. Fig. 3 is a transverse sectional view through one of the expanding-rollers and its housing, taken on the line $y\ y$ of Fig. 4 and looking in the direction of the arrows. Fig. 4 is a longitudinal section view of the same, taken on the line $z\ z$ of Fig. 3 and looking in the direction of the arrows. Fig. 5 is an elevation, partly in section, showing the tool arranged as a cutter. Fig. 6 is a sectional view taken on the line $u\ u$ of Fig. 5 and looking in the direction of the arrows. Fig. 7 is a transverse sectional view of one of the cutters and its housing, taken on the line $v\ v$ of Fig. 8 and looking in the direction of the arrows. Fig. 8 is a longitudinal sectional view of the same, taken on the line $w\ w$ of Fig. 7 and looking in the direction of the arrows; and Fig. 9 is a view, partly in section and partly in elevation, illustrating the extensible feature of the device.

In the said drawings, 1 indicates a shell or casing, preferably circular in cross-section, and adapted to enter the tube to be operated on. This shell or casing is hollow and open at both ends, being preferably of larger diameter at its "forward" end, by which is meant that end which carries the working tools, either cutters or rollers. This enlarged portion is slotted, as indicated at 2, the slots being preferably three in number. At its other end the casing 1 is internally threaded, as indicated at 3, said threaded portion extending from the end of the casing inward to a stop-shoulder 4 and the casing being preferably slightly enlarged at this end also to accommodate the enlargement of the bore or opening of the casing at the threaded portion thereof without diminishing the thickness of the casing. The body portion of the casing is also provided between its ends with a longitudinal slot 5 for the purpose hereinafter set forth. Within the threaded seat thus formed at the rear end of the casing 5 there fits a collar or sleeve 6, having a reduced portion 7, threaded to fit the thread 3 of the casing, and an enlarged body portion 8, lying beyond the end of the casing 5, against which it abuts. This body portion is provided with a circumferential groove 9, which forms one-half of the raceway of a ball-bearing.

10 indicates a hand-wheel or hand-nut having a flange 11, which fits outside the body 8 of the sleeve 6 and has a circumferential groove 12 on its interior, which lies opposite the groove 9 and completes the raceway above referred to. A plurality of bearing-balls 13, located in this raceway, permit the hand-nut 10 to turn freely on the sleeve 6, at the same time preventing relative motion of the two parts longitudinally of the device.

14 indicates a threaded collar or nut proper forming a part of the hand-wheel or hand-nut 10, and in this nut fits a screw 15, which constitutes both a feed-screw for feeding out the working tools and a shaft for rotating the entire implement. To this latter end the rear end of the screw-shaft 15 is provided with an apertured head 16 to receive a lever or handle, by means of which it may be turned.

The front end of the screw-shaft 15 is provided with a threaded extension 17 of less diameter than the body of the shaft, and this extension fits in a correspondingly-threaded socket 18 in the rear end of a tapering mandrel 19, lying within the casing 1. It will be seen that the construction is such that if the screw-shaft 15 is turned while the hand-nut 10 is held stationary or said hand-nut is turned while the screw-shaft is held stationary the mandrel 19 will be moved longitudinally with respect to the casing, thus permitting the said mandrel to be moved forward for thrusting out the working tools or backward to permit their being retracted.

In Figs. 1 to 4, inclusive, I have shown the implement as arranged for work as a tube-expander. The working tools or instrumentalities for this purpose consist of a plurality of rollers 20, corresponding in number with the slots 2, there being three such rollers shown in the present instance. These rollers are preferably made tapering in each direction, being of the greatest diameter at their middle portion and decreasing in diameter toward each end, as shown; but they may be of any suitable configuration. Each roller is mounted in a housing or block 21, having a central opening 22 to receive the roller 20. The block is of less thickness than the diameter of the roller, so that the roller projects both above and below the block, as shown, and the side walls of the opening 22 are curved on a radius corresponding with that of the maximum diameter of the roller, the roller being thus free to turn in the block, while maintaining its position therein. In order to permit the introduction of the roller into the block or housing, this latter is divided transversely, preferably along one end of the opening 22, the two parts being separable and being held together by dowel-pins 23. In this way the two parts of the housing may be separated to permit the insertion of the roller and may then be reunited to inclose the same. Each block fits and slides radially within one of the slots 2, being provided, however, with lateral projections 24, which limit the outward motion of the housing, and thus prevent its dropping out of the casing 1. The inner face 25 of each house is preferably inclined at an angle corresponding with the inclination of the tapering mandrel 19, with which, however, it does not come into contact.

When the implement is used as a tube-expander, it is placed within the tube at the desired point, and the tapering mandrel 19 is then advanced so as to bear against the inner portions of the rollers 20 and force them out against the inner surface of the tube with the desired pressure. The entire implement is then rotated by means of the shaft 15, and the friction of the rotating mandrel against the rollers will cause these latter to turn and roll around, at the same time pressing against the inner surface of the tube on which they travel. It will be noted that it is not the lateral pressure of the bearing-blocks or housings against the rollers which causes these latter to travel around, but the frictional contact of the rollers with the mandrel and tube. By reason of this fact the implement can be turned with less power and while exerting a greater pressure against the tube than is the case where the rollers are mounted in bearings in the casing and the rotative force is applied to the casing to carry the rollers around. In the present instance the casing is carried around by the blocks, which are in turn carried around by the rollers; but since neither the blocks nor the casing exerts any frictional pressure against either the mandrel or the tube the implement can, as already stated, be readily turned. As the work of expanding proceeds the mandrel may be advanced from time to time to force the rollers out; and when the operation is completed the mandrel may be retracted to permit the withdrawal of the implement.

In Figs. 5 to 8, inclusive, I have shown the implement as arranged as a tube-cutter, in which case the working tools are cutting-disks 26, corresponding in number with the slots 2. In this case the rollers 20 and their housings 21 are removed, the cutter-disks 26 being substituted for the rollers and being mounted in housings or blocks 27, which take the place of the housings or blocks 21. Each housing 27 is adapted to fit one of the slots 2 and is provided with projections or shoulders 28, corresponding to the projections or shoulders 24 of the blocks 21 and serving the same purpose—to wit, to limit the outward movement of the blocks. Each block is provided with a central opening 29 to receive the cutter 26 and with a pin 30, extending longitudinally through the block and forming a bearing for the cutter. In this case, however, the blocks bear upon the mandrel 19, their inner face being inclined at an angle corresponding with the taper of the mandrel and being preferably grooved, as shown at 31, to fit the curvature of said mandrel. It will of course be understood that the cutters are of such a diameter that they do not come into contact with the mandrel. Since this is the case, provision must be made for causing the casing 1 to rotate along with the mandrel, and for this purpose I propose to employ any suitable device whereby the casing and mandrel may be connected or disconnected at will. This provision is for the purpose of enabling the rotative force of the mandrel to be imparted directly or positively to the case when the implement is used as a cutter and to be imparted indirectly to the casing through the rollers when the device is used as an expander. The construction which I have shown for effecting this consists of a longitudinal slot 5 in the casing in conjunction with a screw 32, passing through said slot into a threaded aperture 33 in the mandrel, near the outer end thereof. When this screw is in position as shown in Fig. 5, it will be seen that the casing will positively rotate along with the mandrel and will carry the cutters 26 around with it. At the same time the slot will permit the longitudinal movement of the mandrel for feeding out the cutters or withdrawing them. When said screw 32 is removed, as shown in Fig. 1, there is no positive connection between the mandrel, and casing, and this latter receives its rotary movement indirectly through the rollers in the manner hereinbefore described.

The implement thus constructed may be readily used either as an expander or a cutter and gives a maximum efficiency for the force required to operate it in either case.

The construction is also devised for the purpose of operating at a distance from the end of the tube, and this is readily effected, as shown in Fig. 9, by unscrewing the sleeve 6 from the threaded socket at the rear end of the casing 1, at the same time unscrewing the mandrel 19 from the threaded projection 17 of the shaft 15. An ordinary gas-pipe 36 or other suitable connection may be then screwed into the socket 18 and a similar pipe 37, of larger diameter, into the threaded socket 3. These pipes will be of such a length as to bring the implement, or rather that portion thereof carrying the working tools, into proper position within the tube to be operated on. The sleeve 6 is then connected to the outer end of the outer pipe by means of a suitable threaded pipe-coupling 38 of the ordinary construction, and the shaft 15 is similarly connected to the end of the inner pipe by means of a similar coupling 39. In this way the working tools and casing 1 may be located within the tube at any desired distance from the end thereof, while the screw-shaft 15 and hand-nut 10 are located outside of the tube, where they are readily accessible. It should be noted that this extension of the range of utility of the implement is effected by the use of ordinary gas-pipes and couplings, which are always readily obtainable.

I do not wish to be understood as limiting myself to the precise details of construction hereinbefore described, and shown in the accompanying drawings, as the same may be obviously modified without departing from the principle of my invention.

The bearing-balls 13 may be introduced into the raceway in any suitable manner—as, for instance, by means of an aperture 34 in the flange 11, said aperture opening into the groove 12 to permit the introduction of the balls and being closed by a screw-plug or suitable closure 35 after the balls have been so introduced.

Having thus fully described my invention, what I claim as new, and desire to secure by Letters Patent, is—

1. A combined tube expander and cutter, comprising a casing adapted to receive interchangeable and radially-movable cutters and rollers, a tapering mandrel located within said casing, means for moving said mandrel longitudinally with respect to said casing, means for imparting a rotary motion to said mandrel, and means for positively connecting said mandrel and casing to drive the latter directly and positively from the former, and for disconnecting said mandrel and casing, at will, whereby the movement of rotation of said mandrel may be imparted to the case directly through the positive connecting means when the device is used as a cutter, and indirectly through the working instrumentalities when the device is used as an expander, substantially as described.

2. In a combined tube expander and cutter, the combination, with a casing carrying the working tools or instrumentalities, and a tapering mandrel for forcing outward said instrumentalities, said mandrel being movable longitudinally within the casing, and being provided with means for rotating it, of means for positively connecting said mandrel and casing to drive the latter directly and positively from the former, and for disconnecting said mandrel and casing, at will, whereby the rotary motion of said mandrel may be transmitted directly through said positive connecting means to the casing when the device is used as a cutter, and indirectly through the working instrumentalities when the device is used as an expander, substantially as described.

3. In a combined tube expander and cutter, the combination, with a casing carrying the working tools or instrumentalities, and a tapering mandrel movable longitudinally of the casing to force said instrumentalities outward, said mandrel being provided with means for rotating it, and means for feeding it longitudinally of the casing, of a part separably connecting said mandrel and casing, said part detachably engaging one of said members and having a longitudinally-sliding engagement with the other member, substantially as described.

4. In a combined tube expander and cutter, the combination, with a casing carrying the working instrumentalities, and a tapering mandrel movable longitudinally in said casing to force said instrumentalities outward, said mandrel being provided with means for rotating it, and means for feeding said mandrel longitudinally of the casing, of a part separably connecting the mandrel and casing, said part extending through the casing, which is provided with a longitudinal slot to receive the same, and detachably engaging the mandrel, substantially as described.

5. In a combined tube expander and cutter, the combination, with a casing carrying the working instrumentalities, said casing being longitudinally slotted, of a tapering mandrel movable longitudinally of the casing to force said instrumentalities outward, said mandrel being provided with a threaded shaft whereby it may be rotated, a hand-nut mounted to rotate on the casing and engaging said threaded shaft to feed the mandrel longitudinally of the casing, and a part separably connecting the mandrel and casing, said part extending through and traveling in the longitudinal slot of the casing and detachably engaging the mandrel, substantially as described.

6. In an implement of the character described, the combination, with a casing carrying the working instrumentalities, of a sleeve removably mounted in the outer end of said casing, said sleeve being provided with an external circumferential groove, a hand-nut having a flange inclosing said sleeve and having an internal circumferential groove registering with the groove of the sleeve, bearing-balls located in the raceway formed by said grooves and serving to prevent separation of the sleeve and nut in an axial direction, a screw-shaft threaded through the hand-nut, and a tapering mandrel mounted on the end of the screw-shaft within the casing.

7. In an implement of the character described, the combination, with a casing carrying the working instrumentalities, and a tapering mandrel longitudinally movable therein, of a sleeve having a hand-nut rotatably mounted thereon, and a screw-shaft threaded through said nut, said sleeve being separably connected with the casing, and said screw-shaft being separably connected with the mandrel, whereby the working parts within the tube and the operating parts without the tube may be separated for the interposition between them of extension-pieces, substantially as described.

8. In an implement of the character described, the combination, with a casing carrying the working instrumentalities and provided with a threaded socket at its outer end, and a tapering mandrel longitudinally movable within the casing and provided with a threaded socket at its outer end, of a sleeve threaded to fit the socket of the casing and having a hand-nut mounted to rotate thereon, and a screw-shaft threaded through the hand-nut and having a threaded extension to fit the socket of the mandrel, whereby said sleeve and said screw-shaft may be separated from the casing and mandrel to permit the insertion between them of extension-pieces, substantially as described.

In testimony whereof I affix my signature in presence of two witnesses.

HENRY F. WEINLAND.

Witnesses:
 AL. H. KUNKLE,
 F. W. SCHAEFER.